US007608120B2

(12) United States Patent
Wünning

(10) Patent No.: US 7,608,120 B2
(45) Date of Patent: Oct. 27, 2009

(54) COMPACT STEAM REFORMER WITH AUTOMATIC LOAD MATCHING CAPABILITY

(75) Inventor: Joachim Wünning, Leonberg (DE)

(73) Assignee: WS Reformer GmbH, Renningen (DE)

( * ) Notice: Subject to any disclaimer, the term of this patent is extended or adjusted under 35 U.S.C. 154(b) by 273 days.

(21) Appl. No.: 11/514,537

(22) Filed: Sep. 2, 2006

(65) Prior Publication Data
US 2007/0006529 A1    Jan. 11, 2007

Related U.S. Application Data

(63) Continuation-in-part of application No. PCT/EP2005/002194, filed on Mar. 2, 2005.

(30) Foreign Application Priority Data
Mar. 6, 2004  (DE)  .................. 10 2004 010 910

(51) Int. Cl.
*B01J 8/00* (2006.01)
(52) U.S. Cl. .................. 48/127.9; 48/61; 48/62 R
(58) Field of Classification Search .................. 48/62 R
See application file for complete search history.

(56) References Cited

U.S. PATENT DOCUMENTS

| 5,595,833 | A | * | 1/1997 | Gardner et al. ............ 429/19 |
| 6,641,625 | B1 | | 11/2003 | Clawson et al. |
| 2002/0083829 | A1 | | 7/2002 | Edlund et al. |

FOREIGN PATENT DOCUMENTS

| JP | EP 0 922 666 A | 6/1999 |
| WO | WO 98/08771 | 3/1998 |
| WO | WO 02/085781 | 10/2002 |

* cited by examiner

*Primary Examiner*—Jennifer K Michener
*Assistant Examiner*—Imran Akram
(74) *Attorney, Agent, or Firm*—R. S. Lombard; K. Bach

(57) ABSTRACT

The novel compact steam reformer (1) combines in one device the steam reformation of natural gas or other fuel, including subsequent cleaning of CO. Controlled catalytic CO cleaning is achieved by careful temperature control at the follow-up reactor (37, 39, 39*a*). Temperature control is made possible by means of pressure-controlled operation of the evaporator (24).

12 Claims, 2 Drawing Sheets

COMPACT STEAM REFORMER WITH AUTOMATIC LOAD MATCHING CAPABILITY

CROSS-REFERENCE TO RELATED APPLICATION

This is a continuation-in-part application of international application PCT/EP2005/002194 filed Mar. 2, 2005, and claiming the priority of German application 10 2004 010 910.9 filed Mar. 6, 2004.

BACKGROUND OF THE INVENTION

The invention relates to a compact steam reformer and a method for steam reformation.

In the course of steam reforming hydrocarbons for the generation of hydrogen, the material flow for gas generation and the material flow for heating are kept separately in contrast to auto-thermal reforming. In this way the dilution of the hydrogen with nitrogen from the combustion air is avoided during steam reforming.

A compact steam reformer is known from DE 101 19 083 A1, in which the process water is essentially evaporated by means of the reformate to be cooled. The waste heat from the combustion is recovered by pre-warming the air. NOx formation is avoided by employing the flameless oxidation process. This reformer permits a rapid output regulation and has a degree of effectiveness of up to approximately 80%.

A similar reformer is known from WO 02/085781, which is optimized in respect to its exterior insulation.

These reformers meet the intended expectations. However, there is the desire for further improvements in regard to the simplification of the process regulation and the efficiency of the heat recovery. Moreover, the reformate must be relieved as much as possible of the addition of CO. This must take place so completely that downstream connected CO-sensitive fuel cells are not damaged.

It is known from EP 1 031 374 A2 to place the CO containing process gas into a so-called CO oxidator, which is simultaneously used as a reformate cooler. Cooling is achieved by evaporating the inflowing process gas in an evaporator.

Based on the foregoing, it is the object of the invention to improve the compact steam reformer mentioned at the outset in regard to the conduct of the process and the efficiency of the heat recovery.

This object is attained by means of the compact steam reformer in accordance with the invention as hereinafter described.

SUMMARY OF THE INVENTION

The novel compact steam reformer (1) combines in one device the steam reformation of natural gas or other fuel, including subsequent cleaning of CO. Controlled catalytic CO cleaning is achieved by careful temperature control at the follow-up reactor (37, 39, 39a). Temperature control is made possible by means of pressure-controlled operation of the evaporator (24).

The compact steam reformer in accordance with the invention has a reactor which is heated by means of a burner. A preheating device with a high rate of heat recovery is assigned to the burner. This increases the efficiency of the reforming process. The reformer furthermore has a follow-up reactor, which is designed for performing a shift reaction, follow-up oxidation and/or methane generation from the carbon monoxide portions contained in the raw reformate. The follow-up reactor is in a heat-exchanging connection with a pipe evaporator, which maintains the temperature of the follow-up reactor at a fixed level in a controlled manner. By means of this, the desired selectivity of the follow-up reaction is maintained, even in case of a load change. The pipe evaporator causes the evening-out of the temperature in the follow-up reactor in regard to time, as well as in regard to space. The flow of material in the pipe evaporator causes a heat transport in the follow-up reactor, so that the latter can be rapidly adapted to a load change. This applies in particular if the pipe evaporator and the follow-up reactor operate in accordance with a co-current flow.

By means of the determination of the evaporator temperature, the temperature of the follow-up reactor is simultaneously fixed within such narrow limits that the CO content can be reduced to values of less than 50 ppm. Because of this, catalytic follow-up treatment, filtering or other follow-up treatment of the process gas becomes superfluous. The gas generated by the compact steam reformer can be directly conducted to hydrogen fuel cells.

The temperature of the follow-up reactor can be set in the simplest way by the regulation of the steam pressure. The steam generation temperature for all operational states is simultaneously fixed, along with the steam pressure. Thus, the close thermal connection between the follow-up reactor and the pressure-regulated evaporator, for example by means of the embodiment of the pipe evaporator as a pipe coil and the arrangement of possible catalyzers in the spaces between the pipes, creates favorable conditions for the generation of low-CO hydrogen.

The compact steam reformer can have a jet pump connected to the pipe evaporator or other evaporator, which generates a fuel—steam mixture of a preselected composition and feeds the reactor. This provides the basis for a particularly simple control of the compact steam reformer by means of control techniques. For example, the amount of steam is controlled by an appropriate metering of feed water amounts. The amount of fuel supplied to the reformer for reforming need not be separately controlled and is instead metered in by the jet pump.

BRIEF DESCRIPTION OF THE DRAWINGS

For a better understanding of the invention reference may be made to the accompanying exemplary embodiments of the invention illustrated in the drawings, in which.

DESCRIPTION OF THE PREFERRED EMBODIMENTS

Figure 1:
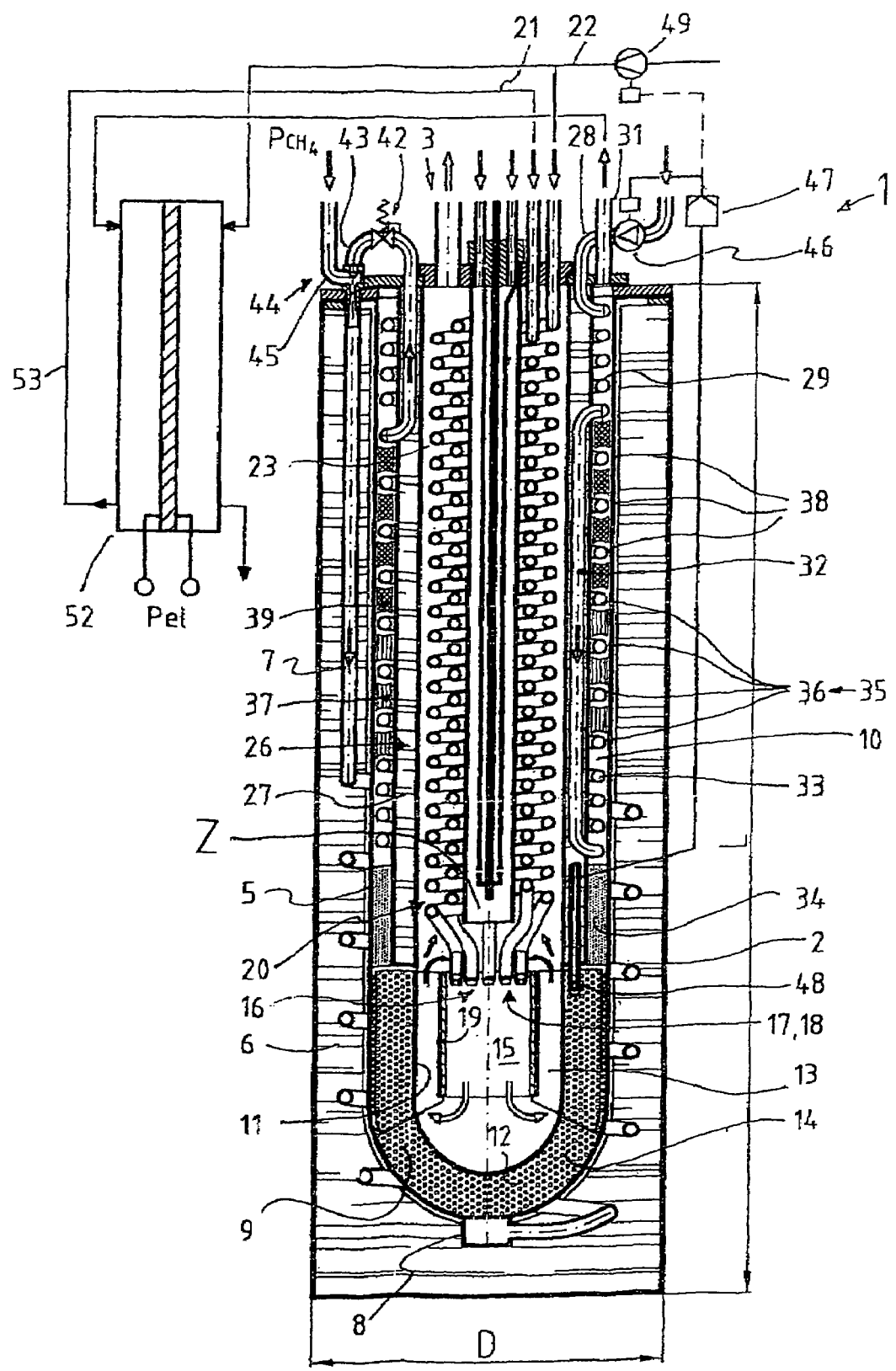
FIG. 1 is a compact steam reformer with an attached fuel cell in a schematic representation.

A steam reformer 1 is represented in longitudinal section in FIG. 1. It has an outer shell 2 of a length L and circular cross section of a diameter D. It can be cylindrical, or also stepped in the form of several cylinders. All connectors 3 are preferably conducted through its upper end 4.

A reformer pipe 5, closed at the bottom, is arranged concentrically inside the shell 2 and at a distance from it. The annular space provided between the shell 2 and the reformer pipe 5 is filled with an insulating material 6 for thermal insulation. A feed line 7 for a mixture of fuel and steam leads from the upper end 4, extending initially straight and then downward by means of turns through the insulating material 6 to a feed connector 8 at the lower end of the reformer pipe 5. The lower, cup-shaped end of the latter constitutes the outer shell of a reactor 9 for performing the actual reforming process. Toward the inside, the reactor 9 is delimited by an inner reformer pipe 11, which is closed off in a cup shape at the bottom and is maintained on the end 4 at the top. A catalyzer 12 for the reforming process is arranged in the cup-shaped annular space between the lower end of the inner reformer pipe 11 and the lower end of the outer reformer pipe 5. Preferably the reformer pipe 11 is provided with ribs 13, 14 on the inside as well as on the outside, which are used for heat transfer between the catalyzer 12 and a combustion chamber 15, which is enclosed by the reformer pipe 11. A burner 16 is assigned to the combustion chamber and is used for heating the catalyzer 12 and is designed to create a flameless oxidation of the fuel introduced into the combustion chamber 15. A number of gas and air nozzles 17, 18 is provided for this purpose, which are arranged, aligned in the same direction, in a ring and create a large-volume circulation. A hollow-cylindrical guide body 19, which is arranged concentrically with the ring of nozzles can assist the large-volume circulation, which is indicated by arrows in FIG. 1.

The gas nozzles 17, as well as the air nozzles 18, are fed via a preheating arrangement 20, which utilizes waste heat. Parts of this are lines 21, 22, which are conducted in the form of coils through an exhaust gas conduit 23 formed inside the upper part of the reformer pipe 11. In this way the combustion gas supplied to the combustion chamber 15, as well as the supplied air, are preheated. A high recouperation degree, and therefore cool exhaust gas, is achieved. Preferably (1-Delta $T_2$/Delta $T_1$)>greater than 0.8, wherein Delta $T_1$ is the exhaust gas difference between the inlet and outlet of the exhaust gas conduit 23 of the preheating arrangement 20, and Delta $T_2$ is the difference between the exhaust gas temperature at the outlet and the fresh air temperature at the outlet. (1-Delta $T_2$/Delta $T_1$) is at least greater than 0.5.

An ignition burner Z or an electric heating device can be centrally provided, which are used for preheating the combustion chamber 15 until the start of the flameless oxidation.

The steam reformer 1 so far described contains a steam generator 24 arranged in the annular space 10 between the outer recouperation pipe 5 and the inner recouperation pipe 11 and is coupled with them in a heat-technological manner. Preferably the steam generator 24 is constituted by a pipe coil, which is divided into several sections and is arranged concentrically in respect to the preheating device. A pipe 25 is arranged in-between, which encloses a further annular space 26 together with the inner reformer pipe 11. This space is filled with an insulating material 27 for the thermal insulation of the exhaust gas conduit 23 from the reformate conduit, which is formed between the outer reformer pipe 5 and the pipe 25 through the annular space 10.

The steam generator 24 has a feedwater connector 28, starting from which a first pipe coil section 29 leads through the reformate conduit, which terminates at a reformate outlet 31. The pipe coil section 29 constitutes a water/reformate counterflow radiator operating in a counterflow manner.

The pipe coil 29 leads to a bridging pipe 32, which leads through the space 26 in the axial direction. It then changes back into the outer annular space 10 constituting the reformat conduit, and is continued there as the pipe coil section 33. It constitutes a water heater and simultaneously a reformate shock cooler (quench cooler, section A in FIGS. 3 and 5). A gas-permeable annular insulating body 34 is arranged between the pipe coil section 33 and the catalyzer 12, which prevents overheating of the steam generator 24 when there is no load, i.e. in case of a feedwater flow-through of zero or close to zero.

Figure 3:
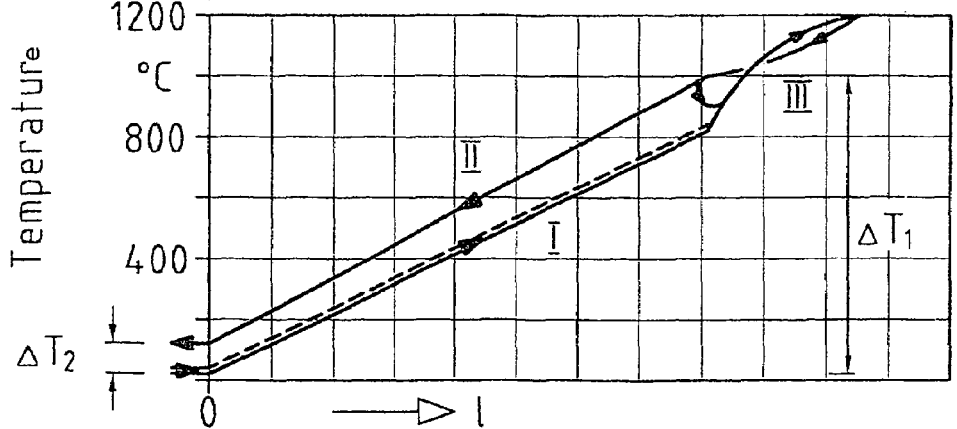
FIG. 3 is the temperature profile of the heating gases in the form of a diagram; and, FIG. 4 is the compact steam reformer in schematic longitudinal section with the allocation of its work zones to the diagrams in accordance with FIGS. 2 and 3.

A further pipe coil section 35 follows the pipe coil section 33 and consists of several coils 36, 38 (section B in FIGS. 3 and 5). These coils 36, 38 have been embedded in a catalyzer, which also fills spaces between coils and constitutes a follow-up reactor. Here, the first coils 36 have been embedded, for example, in a CO-shift catalyzer 37. In the present exemplary embodiment the subsequent coils 38 (section C in FIGS. 3 and 5) have been embedded in a methane-generating catalyst 39. The catalysts 37, 39 can be attached to a suitable catalyst body, such as a woven wire device or the like, for example, or also deposited as loose bulk material between the coils 36, 38, or can be directly formed on the ribs of an evaporator embodied as a ribbed pipe.

In this way the evaporator 24 is divided into three sections A, B, C, namely the pipe coil section 33 for the at least partial evaporation of the water and shock cooling of the reformats, as well as the sections constituted by the coils 36 and 38, in which the further, to a large extent complete evaporation of the water is provided by heat exchange with the respective catalyzers 37, 39. The catalysts 37, 39 constitute the two-stage follow-up reactor.

The outlet of the evaporator 24 is connected via an ascending pipe 41 with a pressure-control valve 42, which maintains the pressure in the evaporator 24 constant, regardless of the flow through it. The steam emitted by the pressure-control valve 42 is conducted to the propellant nozzle connector 43 of a jet pump 44, whose suction connector 45 is connected to a fuel feed line. Its outlet feeds a mixture of steam and fuel to the feed line 7.

The feedwater connector 28 is provided with feedwater by a feedwater pump 46. The latter is controlled or regulated by a control device 47 on the basis of a temperature of the catalyzer 12 detected by means of a temperature sensor 48 in such a way, that the temperature of the catalyzer 12 is kept constant. Since the air requirement for the burner and the fuel cell are proportional to the energy supply PCH4, and therefore the feedwater temperature, the regulation ratio of the air blower 49 can track in a simple manner the regulation ratio of the feedwater pump 46, which is specified by the control device 47.

Air and combustion gas are supplied via the lines 21, 22. The residue gas from the anode of a fuel cell can be used as the combustion gas.

The reformate is conducted to an anode input of a fuel cell 52. Residue gas generated by the anode is conducted via a line 53 to the preheating arrangement 20. The blower 49 conveys air to the cathode of the fuel cell and to the preheating arrangement 20.

Figure 4:
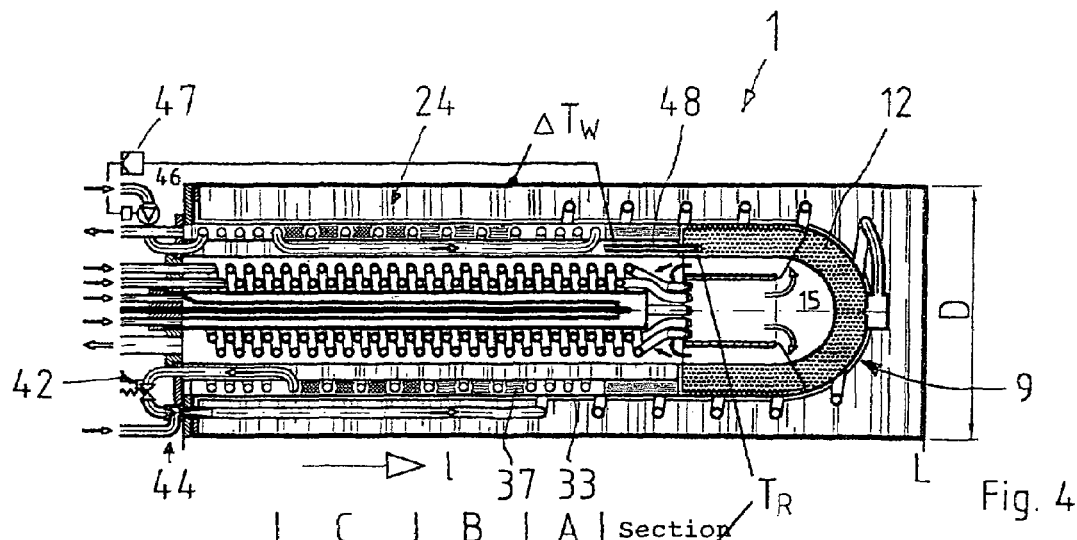
Figure 2:
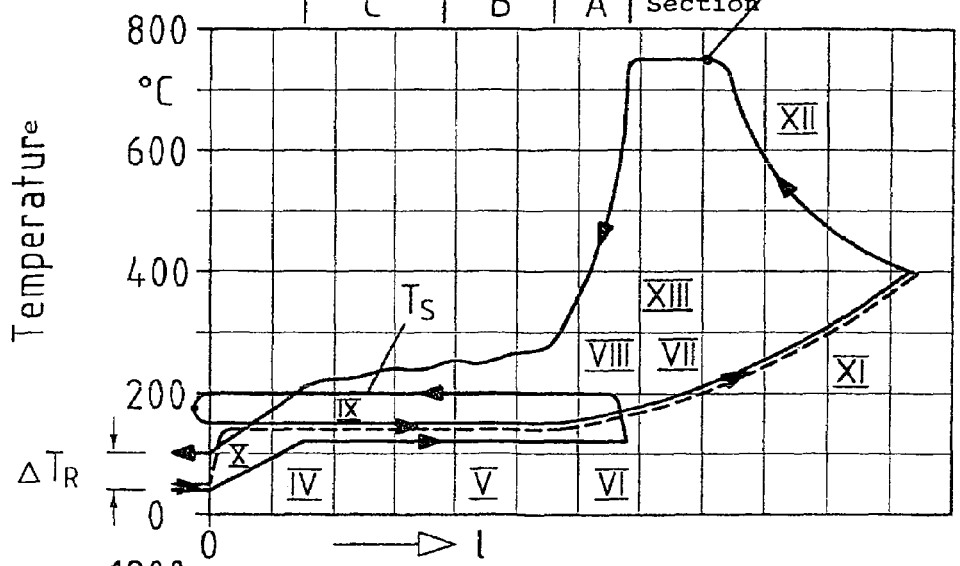
FIG. 2 is the temperature profile of the process gases in the form of a diagram.

The steam reformer so far described operates as follows: Reference is made to FIGS. 2 to 4. Here, by means of a branch I of a curve, FIG. 3 illustrates the temperature of the gases supplied via the lines 21, 22, namely air and combustion gas. The branch II of the curve illustrates the exhaust gas temperature of the exhaust gas conducted out in counterflow. The represented temperatures reflect the temperature profile in the steam reformer 1 illustrated in FIG. 4, in particular in its recouperator. The loop-shaped branch III of the curve in FIG. 3 represents the temperature in the combustion chamber 15 in the course of the flameless oxidation. As represented, the gas performs several revolutions through the combustion chamber 15. As can be noted, it is possible at an exhaust gas temperature of, for example, 150° C., to attain an air and gas preheating up to approximately 800° C.

The curve in FIG. 2 represents the temperature profile of the gas to be reformed and already reformed. The branch IV of the curve indicates the heating of the feedwater in the pipe coil section 29, which is simultaneously a feedwater preheater and a water reformate counterflow cooler. Now the feedwater, which is under pressure and preheated, is conducted to the evaporator 24 at a temperature of slightly above 100° C. Initially, this is symbolized by the lower horizontal branch V of the curve. The preheated feedwater enters the evaporator at a point VI. It is brought to the evaporation temperature (curve VIII) in the pipe coil section 33, and then passes through the entire evaporator 24, in which it slowly evaporates. In the course of this it retains its evaporation temperature of 200° C., for example, as illustrated by the horizontal branch VIII of the curve. In the same way as a heating pipe, the pipe evaporator 24 sets a uniform temperature for the follow-up reactor. The evaporation temperature $T_s$ is not exceeded. The size of the evaporator temperature is set by means of the evaporator pressure at the pressure-control valve 42.

The temperature profile in accordance with FIG. 2 is also maintained within narrow limits, even in case of load changes, in particular in the last stage. The selectivity of the follow-up reaction is maintained in this way. The temperature setting in the last follow-up reactor stage is here effected solely by pressure control.

From the evaporator 24, the generated steam reaches the jet pump 44. The latter fixes the steam/fuel ratio by means of its ratio between the propellant nozzle diameter and the mixing nozzle diameter. The jet pump 44 aspirates the desired amount of fuel via its suction connector 45 and mixes it with steam. In the process the steam temperature initially slightly drops (FIG. 2, branch XI of the curve), wherein the temperature of the admixed combustion gas suddenly rises (branch X of the curve). Then the temperature slowly rises until the feed connector 8 is reached (branch XI of the curve). In the catalyzer 12 the temperature of the curve continues to increase in accordance with the branch XII until it reaches the temperature $T_R$, which has been detected by the temperature sensor 49 and is constantly regulated by metering in feedwater. The reformate generated by the catalyzer 12 leaves the reactor 9 at this temperature. When encountering the first section of the evaporator 24 (pipe coil section 33), the reformate is shock-cooled (FIG. 2, branch XIII of the curve) as section A.

Thereafter, the cooled reformate reaches the catalysts 37 and 39. There, a follow-up reaction for CO conversion takes place. The precise temperature control prevents too great a methane generation, in particular of the existing $CO_2$ portions.

The steam reformer 1 so far described operates inherently stably. An increased reduction of the electrical output $Pe_1$ worsens the caloric value of the residue gas from the anode. Thus, if the temperature at the temperature sensor 49 drops, the control device increases the feedwater conveyance and therefore the steam generation and the reformate generation. The resultant increase of residue gas from the anode increases the burner output in the combustion chamber 15. In this way the steam reformer 1 performs an automatic matching to the load.

An actual embodied steam reformer 1 has attained the following characteristic values:

$$eta_R = \frac{100(V \times Hu)\text{hydrogen}}{AAAAAAAAAAAAAAAAAAAAAAAAAAAAAAAAAAAAAA} \text{ in \%}$$

$(V \times Hu)$process gas + $(V \times Hu)$heating gas $V[m^3/h]$ — volume flow in standard state $Hu[kWh/m^3]$ — caloric value Efficiency of the conversion into hydrogen when heating the reformer with residue gas from the anode:

$$eta_R = \frac{100(V \times Hu)\text{hydrogen}^*}{AAAAAAAAAAAAAAAAAAAAAAAAAA} \text{ in \%}$$

$(V \times Hu)$process gas

*hydrogen converted in the fuel cell (typically 75%)

Example of the novel reformer:
Exterior dimensions: L=0.6 m, D=0.3 m - Process gas: 1 m³/h natural gas of caloric value of 10 kWh/m³ - Water: 2.5 kg/h at 15 bar (=3 m³/h steam, S/C=3)
Heating gas: 0.41 m³/h natural gas of caloric value of 10 kWh/m³ - Reformate: 4 m³/H$_2$ of caloric value of 3 kWh/m³ - Efficiency $eta_R$=85%

When heating with residue gas from anode: (25% of H$_2$ from the reformate, includes CH$_4$ formed during methane generation)
Available hydrogen: 2.7 m³/h of caloric value of 3 kWh/m³ - Efficiency $eta_R$=81%

The losses of the reformate which can be affected are respectively proportional Delta $T_w$ (Delta $T_w$ is the difference between wall temperature and ambient temperature), Delta $T_2$ and Delta $T_R$ (see FIG. 2). They are furthermore a function of the excess steam in the reformate, which is necessary for soot-free reforming and the shift reaction.

The novel compact steam reformer 1 combines in one device the steam reformation of natural gas or other fuel, including subsequent cleaning of CO. Controlled catalytic CO cleaning is achieved by careful temperature control at the follow-up reactor 37, 39, 39a. Temperature control is made possible by means of pressure-controlled operation of the evaporator 24.

What is claimed is:
1. A compact steam reformer (1) comprising,
an outer shell (2),
a reformer pipe (5) arranged concentrically within the outer shell (2), the reformer pipe (5) closed at the bottom,
an inner reformer pipe (11) arranged concentrically within the reformer pipe (5), the inner reformer pipe (11) closed at the bottom,
a reactor (9) housed between the bottom of the reformer pipe (5) and the bottom of the inner reformer pipe (11), the reactor (9) comprising a catalyzer (12),
a combustion chamber (15) operatively arranged within the bottom of the inner reformer pipe (11),
a burner (16) housed within the combustion chamber (15), the material flow for the burner (16) maintained within the inner reformer pipe (11) and separate from the material flow for the reactor (9), the material flow for the burner (16) including at least partially supplied residue gas from the anode of a fuel cell (52) and air, the reactor (9) in heat transfer relationship with the burner (16), the reactor (9) for generating reformate from fuel and $H_2O$ steam, a preheating arrangement (20) housed within the inner reformer pipe (11) above the combustion chamber (15) and in fluid communication with the burner (16), the preheating arrangement (20) for preheating at least one of supplied air and supplied fuel while recouping exhaust gas heat from the combustion chamber (15), an outer annular chamber (10) through which reformate flows and which is thermally insulated toward the exterior, the outer annular chamber (10) is arranged within the reformer pipe (5) above the reactor (9) and in fluid communication with the reactor (9), the outer annular chamber (10) surrounding the preheating arrangement (20), a pipe evaporator (24) housed within the outer shell (2) arranged in heat transfer relationship with the outer annular chamber (10), the pipe evaporator (24) used for the generation of $H_2O$ steam under pressure, a follow-up reactor (37, 39, 39a) housed within the outer annular chamber (10), the follow-up reactor (37, 39, 39a) in fluid communication with the reactor (9), the follow-up reactor (37, 39, 39a) in heat transfer relationship with the pipe evaporator (24) through which water and steam flows, the follow-up reactor (37, 39, 39a) for the extensive removal of carbon monoxide portions of the created reformate, means for maintaining a uniform temperature for the follow-up reactor (37, 39, 39a), and means for performing an automatic matching of the load.

2. The compact steam reformer of claim 1, wherein the reformate and water flow through the follow-up reactor (37, 39, 39a) and the pipe evaporator (24) in the same flow direction.

3. The compact steam reformer of claim 1, wherein a water/reformate counterflow cooler (29) is connected to the inlet side of the pipe evaporator (24) and the outlet side of the follow-up reactor (37, 39, 39a).

4. The compact steam reformer of claim 1, wherein the follow-up reactor (37, 39, 39a) contains at least one of a shift catalyzer (37) and a methane-generating catalyzer (39) and a follow-up oxidation catalyzer (39a).

5. The compact steam reformer of claim 1, wherein the pipe evaporator (24) is a pressure-proof pipe coil, having coil spaces in which the follow-up reactor (37, 39, 39a) for encouraging the follow-up reaction is arranged.

6. The compact steam reformer of claim 1, wherein the pipe evaporator (24) is a pressure-proof ribbed pipe.

7. The compact steam reformer of claim 1, wherein the means for maintaining a uniform temperature for the follow-up reactor (37, 39, 39a) comprises a pressure-control valve (42) connected to the outlet of the pipe evaporator (24), the outlet of the pressure-control valve (42) for emitting steam, a jet pump (44) including a propellant nozzle connector (43) connected in fluid communication with outlet of the pressure-control valve (42), the jet pump (44) also including a suction connector (45) in fluid communication with a fuel feed line, the outlet of the jet pump (44) in fluid communication with a feed line (7) for feeding a mixture of steam and fuel to feed line (7), the feed line (7) in fluid communication with the reactor (9).

8. The compact steam reformer of claim 7, wherein the pressure-control valve (42) is adjusted to such a pressure that the evaporation temperature of the water in the pipe evaporator (24) is set to a temperature between 130° C. and 280° C.

9. The compact steam reformer of claim 1, wherein the flow of material in the pipe evaporator (24) contains a liquid phase, in the area which is in thermal connection with the follow-up reactor (37, 39, 39a).

10. The compact steam reformer of claim 7, wherein the jet pump (44) is an unregulated jet pump.

11. The compact steam reformer of claim 1, wherein the means for performing an automatic matching of the load comprises a temperature sensor (48) operatively connected to the reactor (9) for sensing the temperature of the catalyzer (12), a feedwater connecter (28) in fluid communication with the pipe evaporator (24), a feed water pump (46) in fluid communication with the feed water connector (28), a control device (47) operatively connected to the feed water pump (46), the temperature sensor (48) operatively connected to the control device (47) for regulation of the feedwater pump (46), an air blower (49) in fluid communication with the burner (16), the air blower (49) operatively connected to the control device (47) for regulation of the air supply to the burner (16) and the fuel cell (52).

12. The compact steam reformer of claim 11, wherein the wherein the means for performing an automatic matching of the load further comprises an air blower (49) in fluid communication with the burner (16) for supplying the burner (16) with combustion air, the air blower (49) operatively connected to the control device (47) for regulation of the air supply to the burner (16) and the fuel cell (52).

* * * * *